J. F. McELROY.
ELECTRIC HEATER.
APPLICATION FILED JUNE 25, 1907.
959,872.
Patented May 31, 1910.
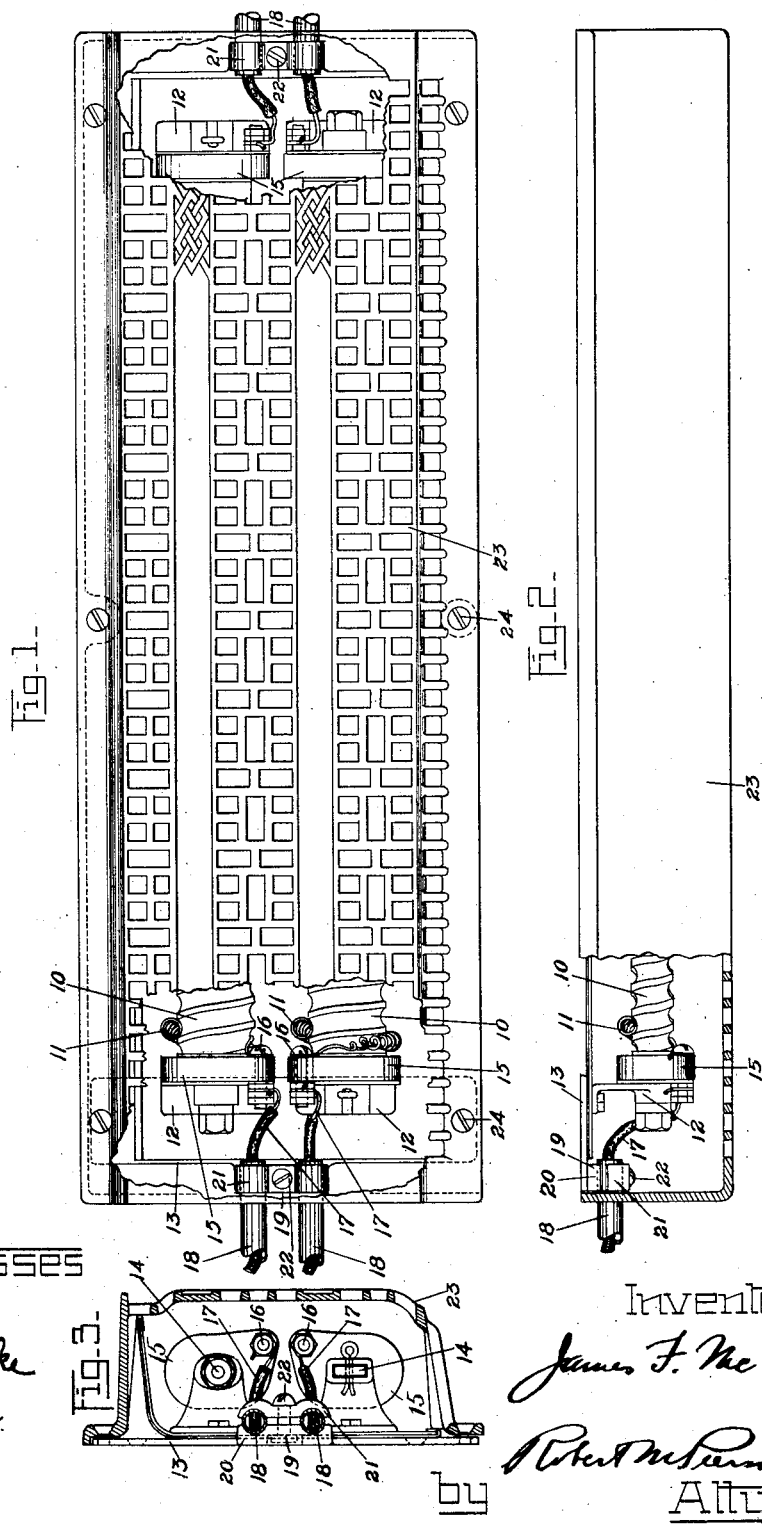
Witnesses
G. Blake
W. R. Schulz
Inventor
James F. McElroy
by
Robert McPherson
Atty.

UNITED STATES PATENT OFFICE.

JAMES F. McELROY, OF ALBANY, NEW YORK, ASSIGNOR TO CONSOLIDATED CAR-HEATING COMPANY, OF ALBANY, NEW YORK, A CORPORATION OF WEST VIRGINIA.

ELECTRIC HEATER.

959,872.      Specification of Letters Patent.      Patented May 31, 1910.

Application filed June 25, 1907. Serial No. 380,730.

*To all whom it may concern:*

Be it known that I, JAMES F. MCELROY, a citizen of the United States, residing at Albany, in the county of Albany and State of New York, have invented certain new and useful Improvements in Electric Heaters, of which the following is a specification.

This invention relates to electric heaters, especially car-heaters, and its purpose is to provide increased protection for the joint or splice between the heater-wires and the supply wires and also to detachably connect the wire tubes or conduits with the heater casing.

Of the accompanying drawings, Figure 1 shows a front elevation, partly broken away, of a double heater constructed according to my invention. Fig. 2 represents a plan view thereof, with one end of the casing broken away. Fig. 3 represents an end view of the heater, with the casing in section.

In the drawings, 10, 10 are porcelain cores, with the coiled wire heating elements 11 wound thereon, and 12 are metal brackets attached to the vertical base 13 of the heater casing and supporting the ends of the rods 14 which pass through the cores.

15 are porcelain heads at each end of the cores, these heads being formed with holes through which are passed bolts or binding-posts 16, forming continuations of the wire heating elements 11, these binding-posts receiving at their outer ends the ends of the insulated supply wires 17 whereby current is conducted to the heater. The supply wires 17 are mounted in protective tubes 18 whose ends are detachably secured to the heater casing by means of a double clamp 19. The latter is composed of a fixed part 20 formed on the base 13, and a removable plate 21 secured to said fixed part by a bolt 22, the two parts of the clamp being appropriately grooved or recessed to receive and confine the ends of the wire conduits 18.

23 is a perforated cap or cover detachably secured by screws 24 to the base 13 and extending over both heater and the joint connecting the heater-wires with the supply wires. Thus the heater is exposed to the air between its heads 15 and protected by the cover 23, while the two ends of the casing, formed by said cover and the base, constitute junction-boxes for protecting the connection between the heater-wires and the supply wires, this junction-box having the clamp 19 for securing the ends of the wire conduits 18.

The form of heater which I have shown is designed to be mounted upon the riser under a car seat, and may be connected in series with a number of other heaters placed along the riser, the connection between adjacent heaters being preferably effected by means of short insulated wires mounted in tubes whose ends are attached to the clamp 19. Preferably the heaters are first mounted in position with their covers off, and the ends of the wire conduits are bound in place by the clamps independently of said covers. The supply wires are then strung through the conduits and the connection made with the heater-wires in the space between the end of the casing and the heads 15, the connection being either direct from the supply wires to the binding-posts, or in any other suitable fashion. After the connections are made and the heaters tested, their covers 23 are attached so as to protect the heater and the wire junctions. This heater may be made in single form with connections all at one end, or in various other ways, and the form of the casing may be suitably varied, all without departing from the spirit of the invention.

I claim:—

1. In an electric heater, the combination with a conduit inclosing a leading-in wire, of a heater base, an electric heating resistance mounted thereon, means for clamping said conduit to the base, and a junction-box covering said clamping means and the connection between the leading-in wire and the heating resistance and adapted to be removed and replaced without disturbing said clamping means or said connection.

2. In an electric heater, the combination of a heater base having a clamp for anchoring the end of a conduit containing a leading-in wire, an electric heating resistance mounted on said base, and a cover for said heating resistance having an extension which forms a junction-box inclosing the clamp and adapted to be removed and replaced without disturbing said clamp or the connection between the leading-in wire and the heating resistance.

In testimony whereof I have hereunto set my hand in the presence of two subscribing witnesses, the 22nd day of June, 1907.

JAMES F. McELROY.

Witnesses:
 BEULAH CARLE,
 ERNEST D. JANSEN.